(12) United States Patent
Los et al.

(10) Patent No.: US 7,898,741 B2
(45) Date of Patent: Mar. 1, 2011

(54) COLOUR DISPLAY DEVICE

(75) Inventors: Remco Los, Eindhoven (NL); Andrea Giraldo, Den Bosch (NL); Anthony Slack, Lorgues (FR)

(73) Assignee: Liquavista, B.V., Eindhoven (NL)

( * ) Notice: Subject to any disclaimer, the term of this patent is extended or adjusted under 35 U.S.C. 154(b) by 0 days.

(21) Appl. No.: 12/303,467

(22) PCT Filed: Jun. 1, 2007

(86) PCT No.: PCT/EP2007/055422
§ 371 (c)(1),
(2), (4) Date: Jul. 24, 2009

(87) PCT Pub. No.: WO2007/141219
PCT Pub. Date: Dec. 13, 2007

(65) Prior Publication Data
US 2010/0067092 A1 Mar. 18, 2010

(30) Foreign Application Priority Data
Jun. 6, 2006 (GB) .................................. 0611126.4

(51) Int. Cl.
G02B 1/06 (2006.01)
G03B 21/14 (2006.01)
(52) U.S. Cl. .......................................... 359/665; 353/84
(58) Field of Classification Search .................. 359/665, 359/666; 353/84
See application file for complete search history.

(56) References Cited

FOREIGN PATENT DOCUMENTS

| EP | 1 400 834 | 3/2004 |
|---|---|---|
| WO | WO 03/071346 | 8/2003 |
| WO | WO 2003/071346 | 8/2003 |
| WO | WO 2004/027489 | 4/2004 |
| WO | WO 2004/032523 | 4/2004 |
| WO | WO 2004/068208 | 8/2004 |
| WO | WO 2004/097512 | 11/2004 |
| WO | WO 2005/098524 | 10/2005 |

OTHER PUBLICATIONS

United Kingdom Search Report dated Oct. 17, 2006 issued in corresponding Application No. GB0611126.4.
International Search Report issued Aug. 31, 2007 in corresponding International Application No. PCT/EP2007/055422.
Feenstra, B. J. et al., "Electrowetting-Based Displays: Bringing Microfluidics Alive On-Screen", Micro Electro Mechanical Systems, 2006, MEMS 2006 Istanbul, 19th IEEE, International Conference on Istanbul, Turkey.
Hayes, R. A. et al., "Video-Speed Electronic Paper Based on Electrowetting", Nature, Nature Publishing Group, London, GB, vol. 425, No. 6956, Sep. 25, 2003, pp. 383-385.

(Continued)

Primary Examiner — William C Choi
(74) Attorney, Agent, or Firm — BainwoodHuang

(57) ABSTRACT

A color display device (1) comprises a plurality of picture elements (3, 4, 5), the plurality of picture elements having a viewing side (5) and a rear side (6). Each picture element includes a light valve (7, 8, 9). The display device comprises a switchable part (12, 13) for selectively directing light of a first color and light of a second color through the light valve from the rear side to the viewing side. Each light valve comprises a first and a second switchable color filter (17, 19) having a transmittance for a third color and a fourth color, respectively, and arranged in succession in the path of the light.

20 Claims, 1 Drawing Sheet

OTHER PUBLICATIONS

Feenstra, B. J. et al., "A Video-Speed Reflective Display Based on Electrowetting: Principle and Properties", Journal of the Society for Information Display, Society for Information Display, San Jose, US, vol. 12, No. 3, 2004, pp. 293-299.

Anonymous, "A Reflective Display Based on Electrowetting", IP. Com Journal, IP. Com Inc., West Henrietta, NY, US, Jul. 15, 2004.

Hayes I R. A. et al., "52.1: A High Brightness Colour 160 PPI Reflective Display Technology Based on Electrowetting", 2004 SID International Symposium, Seattle, WA, May 25-27, 2004, SID International Symposium, San Jose, CA, US, May 25, 2004, pp. 1412-1415.

International Search Report for PCT/EP2007/055422, mailed Sep. 10, 2007.

Written Opinion of the International Searching Authority for PCT/EP2007/055422, mailed Sep. 10, 2007.

Feenstra, B. J. et al., "Electrowetting-Based Displays: Bringing Microfluidics Alive On-Screen", Micro Electro Mechanical Systems, (Jan. 22, 2006), pp. 48-53.

Hayes, R. A. et al., "Video-speed Electronic Paper Based on Electrowetting", Nature, vol. 425, No. 6956, (Sep. 25, 2003), pp. 383-385.

Feenstra, B. J. et al., "A Video-Speed Reflective Display Based on Electrowetting: Principle and Properties", Journal of the Society for Information Display, vol. 12, No. 3, (2004), pp. 293-299.

Anonymous: "A Reflective Display Based on Electrowetting", IP.Com Journal, (Jul. 15, 2004).

Hayes, 1 R. A. et al., "52.1: A High Brightness Colour 160 PPI Reflective Display Technology Based on Electrowetting", SID International Symposium, (May 25-27, 2004), pp. 1412-1415.

COLOUR DISPLAY DEVICE

This application is the U.S. national phase of International Application No. PCT/EP2007/055422, filed 1 Jun. 2007, which designated the U.S. and claims priority to Great Britain Application No. 0611126.4, filed 6 Jun. 2006, the entire contents of each of which are hereby incorporated by reference.

FIELD OF THE INVENTION

The invention relates to a colour display device and a method of operating such a display device.

BACKGROUND OF THE INVENTION

A colour display device is disclosed in international patent application WO 2004/032523. This known display device uses the so-called spectrum sequential method for displaying an image. In one embodiment the transmissive display panel comprises two LCD light valves for each picture element, each valve including a filter for transmitting a part of the visible spectrum. The panel is back-lighted by two selectable light sources having different radiance spectra. A time-sequential switching of the light sources combined with control of the light valves in accordance with the image information to be displayed allows display of an image having a wide colour gamut.

A disadvantage of the known device is the relatively low efficiency of the illumination caused by the need to use two light valves per picture element to achieve the desired colour gamut.

It is an object of the invention to provide a colour display device having an improved efficiency of the illumination and a wide colour gamut.

SUMMARY OF THE INVENTION

The object is achieved by a colour display device comprising a plurality of picture elements, the plurality of picture elements having a viewing side and a rear side, each picture element including a light valve, the display device comprising a switchable part for selectively directing light of a first colour and light of a second colour along a path of the light through the light valve from the rear side to the viewing side, and each light valve comprising a first and a second switchable colour filter having a transmittance for a third colour and a fourth colour, respectively, and arranged in succession in the path of the light, the first, second, third and fourth colour being different non-white colours.

The combination of at least two switchable colour filters in each light valve and illumination of the valve by light of at least two colours provides a wide colour gamut. The invention achieves this wide gamut by a single light valve where prior art display devices require several light valves for the same gamut. The reduced number of light valves increases the efficiency of the illumination. The first, second, third and fourth colour are four different colours. Colours are different if they have different hues. Hue is defined as the colour's direction from white in the CIE colour diagram, preferably from the white point D65.

The switchable part for the illumination may be switched between various states, depending on the chosen method of illumination. For instance, it may be switched between two states: illumination by the first colour and by the second colour or between three states: illumination between the first colour, the second colour and the combination of the first and second colour or between the first colour, the second colour and a third colour. The three colours may be red, green and blue. The three-state illumination increases the gamut of the display device. It gives greater control over the range of addressed colours and the brightness. The colour filters preferably switch between a transparent state and a state in which one colour is transmitted and the other colours are absorbed. The colour present at the viewing side of a light valve at a certain moment in time depends on the instantaneous colour of illumination and the colour filters in the light valve active at that moment. The switching of the illumination and the colour filters is preferably faster than the response time of the eye, resulting in the perception of a single colour.

In a preferred embodiment each picture element comprises one light valve. A display device having such picture elements does not require sub-pixelation and has the highest achievable aperture ratio and does not require spatial addressing methods for sub-pixel light valves, only temporal addressing methods for the pixel light valves.

The light valve may include liquid crystal elements. Preferably it includes an electrowetting element having a fluid operable as switchable colour filter. An electrowetting element includes an electrowetting cell having a cavity. The cavity comprises a first and a second immiscible fluid. The first fluid can attain two states: a first one in which the fluid covers the aperture of the cell and a second one in which the aperture is substantially free from the fluid. This action makes it possible to use the first fluid as a switchable colour filter, e.g. by providing the fluid with a dye such that it transmits one colour. Each of the fluids may be a liquid or a gas. In a special embodiment of the cell the first fluid can attain states intermediate between the first and second state, thereby allowing control of the intensity of the light transmitted through the cell. Electrowetting cells have the advantage of a high transmission and relatively easy manufacturability in large quantities suitable for forming a display device. In contrast with liquid crystal elements, electrowetting cells do not require polarized light, thereby increasing the efficiency of the light valve.

The light valve may comprise two electrowetting cells arranged in succession in the path of the light, each cell having a colour filter. In that case the plurality of light valves will form two layers of electrowetting cells. Preferably, the light valve comprises an electrowetting cell having two fluids independently operable as switchable colour filter. The cavity of the cell in such a preferred embodiment has a first, second and third fluid, the first and third fluid being immiscible with the second fluid. The first and third layer can act as independently operable colour filters.

The switchable part includes preferably an illumination unit for generating light of the first colour and light of the second colour. The illumination unit may comprise at least a first light source and a second light source for emitting light of the first colour and light of the second colour, respectively, the light sources being independently selectable. The light sources may be conventional light sources. The illumination unit may alternatively comprise a broad band light source and a switchable colour filter for passing light of the first colour or light of the second colour to the light valves. The switchable colour filter may be an electrowetting cell having two fluids independently operable as a switchable colour filter. The switching of the illumination between light of the first and second colour may be carried out by a control unit providing the power for the light sources. When both the light valve and the switchable colour filters comprise electrowetting cells, the display device includes two or three layers of electrowetting cells, depending on whether the number of electrowetting cells in a light valve is one or two.

In a preferred embodiment the illumination unit is arranged on the rear side of the plurality of light valves. The light passes now only once through the light valves, providing a relatively large transmission. The light valves may be illuminated using a plate-like light guide arranged on the rear side of the plurality of picture elements, the light guide having two large surfaces and four small surfaces. The light sources can be arranged on one of the small surfaces. The light guide may be provided with a reflector arranged on the large surface facing away from the picture elements. The reflector can assist in guiding light from the light sources through the light guide and it can reflect ambient light that has entered the display through the picture elements. The first use is for operation of the display device in backlight mode, the second use for operation in reflective mode.

In another preferred embodiment the illumination unit is arranged on the viewing side of the plurality of light valves and a reflector is arranged on the rear side of the plurality of light valves. The embodiment can be used both using ambient light and, when the ambient light level is low, using front illumination by means of a light source such as a lamp or LED.

The switchable part includes preferably a controllable reflector having a reflectance switchable between the first colour and the second colour and arranged on the rear side of the plurality of light valves. This embodiment of the display device operates as a reflective display device that can use ambient light for illumination. The switching between reflection of the first and the second colour will alternatively direct light of the first and the second colour through the light valve from the rear side to the viewing side. The reflector may operate for one light valve or for a plurality of light valves.

The controllable reflector preferably includes a colour filter having a transmission selectable between the first colour and the second colour. It allows the use of conventional controllable colour filters. The controllable reflector may also be in the form of an electrowetting cell operating as reflector.

When the switchable part includes a plurality of controllable reflectors, each reflector being arranged on the rear side of each of the light valves, the reflectors can be patterned in the same way as the light valves.

The reflectance of each of the plurality of reflectors may be made independently controllable. It is then possible to control the selection of the first and second colour for a specific light valve in dependence on the colour that must be visible at the viewing side of this valve. The control may involve different durations of the first and second colour and the phase of the selection compared to a reference signal common to all controllable reflectors.

The above four colours are preferably different colours, more preferably chosen to maximize the gamut. The colours are preferably chosen such that a combination of two colours provides a different colour. This different colour is usually a primary colour or white. In a preferred embodiment the first colour and the second colour are complementary, e.g. when two illumination sources are used. This choice allows a white picture element to be made. The third colour and the fourth colour may be complementary. In a special embodiment all selections of two colours from the colours used in the display device are complementary with respect to white. In particular, the first colour and the third colour are complementary and the second colour and the fourth colour are complementary. When the colours of the first and second switchable colour filters, i.e. the third and fourth colour, are complementary, e.g. green and magenta or red and cyan, a black picture element can be made. The third and fourth colour are preferably primary colours. The third colour and the fourth colour are colours different from white. The combination of colours of the switchable part and the colour filters preferably span a regular polygon in the colour chart to obtain a wide gamut.

A picture element will have an all-colours gamut when the line connecting the first and second colour crosses the line connecting the third and fourth colour at the white point of the CIE1931 colour chart.

In a special embodiment of the display device the switchable part is arranged for selectively directing light of a further colour and/or the light valve comprises a further switchable colour filter having a transmittance for a further colour. The further colour of the light and the further colour of the switchable colour filter may be complementary colours. A possible embodiment of the display device comprises a switchable part for directing three different colours, e.g. in the form of three different light sources, and each light valve includes two switchable colour filters. The further colours increase the gamut of the display.

The invention also relates to a colour display device comprising a plurality of picture elements, the plurality of picture elements having a viewing side and a rear side, each picture element including a light valve, the display device comprising an illumination unit for selectively generating light of a first colour and light of a second colour and directing the light along a path of the light through the light valve from the rear side to the viewing side, and each light valve comprising a first and a second switchable colour filter having a transmittance for a third colour and a fourth colour, respectively, and arranged in succession in the path of the light. The illumination source includes one or more light sources for generating light of the first and second colour. When the illumination unit is arranged on the viewing side of the display device, the illumination unit includes a reflector on the rear side.

The invention also relates to a colour display device comprising a plurality of picture elements, the plurality of picture elements having a viewing side and a rear side, each picture element including a light valve, the display device comprising a controllable reflector having a reflectance selectable between a first colour and a second colour and arranged on the rear side of the plurality of light valves, and each light valve comprising a first and a second switchable colour filter having a transmittance for a third colour and a fourth colour, respectively, and arranged in succession in the path of the light. The embodiment is suitable for illumination by ambient light and/or front illumination by means of a light source such as a lamp or LED. The front illumination may be used when the ambient light level is low.

All additional specific features of the first-mentioned embodiment of the colour display device can equally advantageously be applied alone or in combination to the above two embodiments of the colour display device.

The invention also relates to a method of forming a colour image using a plurality of picture elements, the plurality of picture elements having a viewing side and a rear side, each picture element containing a light valve, the method comprising the steps of time-sequentially directing light of a first colour and light of a second colour through the light valve from the rear side to the viewing side, and filtering the light by a first and a second switchable colour filter in the light valve, the first and second filter having a transmittance for a third colour and a fourth colour, respectively, and arranged in succession in the path of the light, the switching of the colour filters being synchronous with the time-sequentially directing light of the first colour and light of the second colour.

Further features and advantages of the invention will become apparent from the following description of preferred

DETAILED DESCRIPTION OF THE INVENTION

Figure 1:
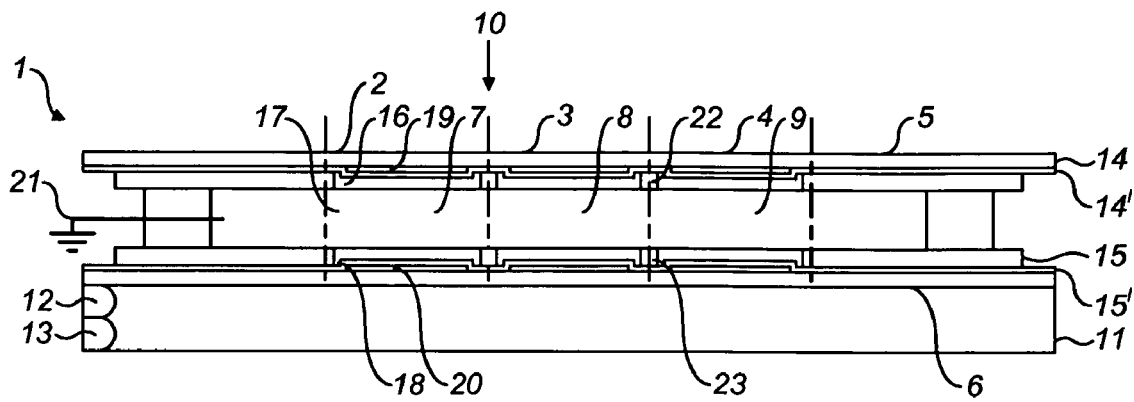
FIG. 1 shows a diagrammatic cross-section of a part of the first embodiment of the display device.

FIG. 1 shows a diagrammatic cross-section of a part of a first, transmissive embodiment of a colour display device 1 according to the invention. The Figure shows three picture elements 2, 3, 4 of the plurality of picture elements that cover the image area of the colour display device. The lateral extent of the three picture elements is indicated in the Figure by four dashed lines. The cross-section of a picture element in a plane perpendicular to that of the Figure may have any shape, for instance square or circular. The plurality of picture elements has a viewing side 5 and a rear side 6. Each picture element contains a light valve 7, 8, 9. In this embodiment the light valve coincides with the picture element. Light passes through each valve from the rear side 6 to the viewing side 5. The image formed by the light from the plurality of picture elements can be viewed from a viewing direction indicated by the arrow 10.

An illumination unit 11 is attached to the rear side 6 of the plurality of light valves to provide backlighting of the light valves. The illumination unit comprises a first light source 12 and a second light source 13 for generating light of a first colour and light of the second colour, respectively. The light sources may be conventional light sources, such as fluorescent lamps or LED's. In this embodiment the first colour is yellow and the second colour is blue. By controlling the electrical input power of each light source, it is possible to control the amounts of yellow light and blue light and change these amounts as a function of time. The yellow and blue light is directed through the light valve towards the viewing side 5. The illumination unit may be of a conventional construction, such as disclosed for instance in international patent application WO 2006/011101.

Each light valve comprises an electrowetting cell. In the embodiment shown in the Figure the electrowetting cell coincides with the light valve. The electrowetting cell 7 comprises two transparent substrates or support plates 14, 15, common to the plurality of electrowetting cells. A cavity between the substrates is filled with three liquids: a first liquid 16, a second liquid 17, and a third liquid 18. The first and third liquids are immiscible with the second liquid. The first and third liquids are electrically non-conductive and may for instance be an alkane like hexadecane or (silicone) oil. The second liquid is electrically conductive or polar, and may be a water or salt solution such as a solution of KCl in a mixture of water and ethyl alcohol. The second liquid is preferably transparent. The surfaces of the substrates facing the cavity are made hydrophobic, for instance by application of an amorphous fluoropolymer layer 14', 15', such as AF1600. The hydrophobic character causes the first and third liquid to adhere preferentially to substrates 14 and 15, respectively.

Each electrowetting cell includes an electrode 19 arranged on substrate 14 and an electrode 20 arranged on substrate 15. The electrodes are separated from the liquids by an insulator, which may be said fluoropolymer layer. A third electrode 21 is connected to the conductive second liquid 17. This electrode may be common to a series of electrowetting cells that share the second liquid, uninterrupted by walls. The electrodes on each substrate are connected to an electrical terminal on the substrate by a matrix of printed wiring. The electrodes and wiring are preferably transparent and made of e.g. indium tin oxide. The matrix may include switching elements such as transistors; in this case the matrix is called an active matrix.

The lateral extent of the first liquid 16 and the third liquid 18 is constrained to one electrowetting cell by walls 22, 23 that follow the cross-section of the electrowetting cell. Further details of the electrowetting cell and its manufacture are disclosed amongst others in international patent application WO 2005/098797.

When a nonzero voltage is applied between the electrodes 19 and 21, the second liquid 17 repels the first liquid 16 from the area of the electrode 19 to the walls 22 surrounding the area of the electrode. This action removes the first liquid from the optical path of the light from the rear side 6 to the viewing side 5 through the electrowetting cell. When the voltage is returned to zero, the first liquid flows back to cover the hydrophobic area of the top part of the cavity. The same action can be applied independently to the third liquid 18 by controlling the voltage between the electrodes 20 and 21.

The first and third liquids are coloured, for example by adding optically active particles to the oil or dissolving a dye material in the oil. The first and third liquids have a transmittance for a third colour and a fourth colour, respectively, thereby allowing them to operate as a switchable colour filter. When the voltage between the electrodes is zero the filter is in the light path of the electrowetting cell, and when the voltage is nonzero the filter is not in the path. The first liquid 17 and the third liquid 19 operate as a first and second switchable colour filter, respectively.

In the embodiment shown the first colour filter has a transmittance for green and the second colour filter for magenta. The colour of the light emitted at the viewing side 5 of electrowetting cell 7 depends on the selected colour filters and on the selected light source(s). Table I shows the possible colours.

TABLE 1

Colour table for display

| Light source | Colour filter | Viewing side colour |
|---|---|---|
| yellow | none | yellow |
| yellow | green | green |
| yellow | magenta | red |
| yellow | green & magenta | black |
| blue | none | blue |
| blue | green | black |
| blue | magenta | blue |
| blue | green & magenta | black |
| yellow & blue | none | white |
| yellow & blue | green | green |
| yellow & blue | magenta | magenta |
| yellow & blue | green & magenta | black |
| none | none | black |
| none | green | black |
| none | magenta | black |
| none | green & magenta | black |

In the above description of the electrowetting cell the first liquid either completely covers the area of the electrode 19 or is completely removed from it. International patent application WO 2003/071346 discloses measures that allow the first liquid to cover the area of the electrode 19 only partially, thereby realizing so-called grey values. When both the first and the second colour filter can produce gray values, the display device can also emit light having colours in between the colours mentioned in the table as well as change the intensity of the colours.

The colour display device is controlled by a control unit, not shown in the Figure. The control unit can deliver power selectively to the first and the second light source. The control unit also provides the electrical signals to control the first and second colour filter in each light valve of the display device.

In a mode of operation the control unit switches between two states. In each state both the switchable part in the form of a light source and the colour filters are set in a required mode. In the first state the first light source illuminates the light valves, in the second state the second light source illuminates the light valves. The states alternate with each other and have equal duration. The duration of a state is preferably half the duration of the image refresh period. If the image refresh rate or frame rate is 60 Hz, the light sources switch at 120 Hz. During each state the first and second colour filter in each light valve is switched according to the light source selected during the particular state and the desired colour of the picture element. The colour filters are also switched at 120 Hz for an image refresh rate of 60 Hz. The image refresh rate may be higher than 60 Hz, e.g. 100 Hz, or lower. In the latter case a reduced power consumption may be achieved; however, measures to avoid flicker might need to be taken.

Figure 2:
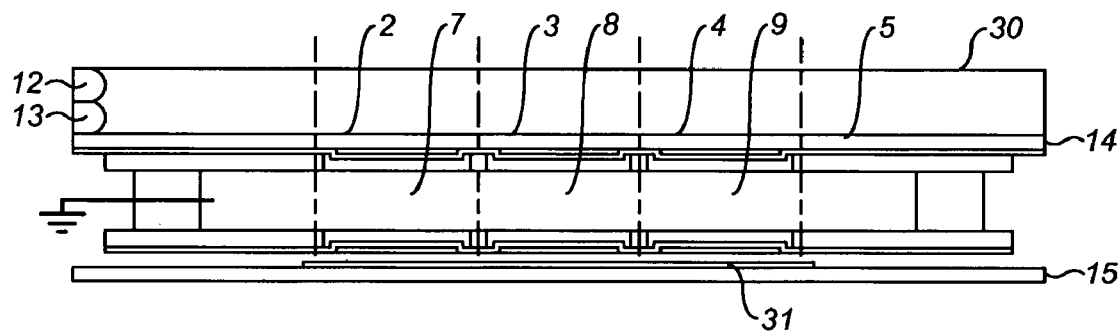
FIG. 2 shows a diagrammatic cross-section of a part of the second embodiment of the display device.

FIG. 2 shows a second embodiment of the colour display device in which an illumination unit 30 is arranged on the viewing side 5 of the display device. The illumination unit should provide an even illumination of the light valves. Several embodiments of such a front-light illumination unit are disclosed in the international patent application WO 2004/097512. A reflector 31 is positioned on the support plate 15, e.g. an aluminium layer. The Figure shows the reflector and support plate detached from the plurality of light valves for sake of clarity only; in an actual display device the support plate usually adjoins the light valves directly. The reflector has preferably a broad-band reflectance, covering the gamut as determined by the sources and filters and may be specular or, preferably, diffusive. The reflector may be a single reflector element, covering all light valves of the display device or a plurality of reflector elements, each element operating for a single light valve. The construction of the light valves 7, 8, 9 is the same as shown in FIG. 1. The switchable colour filters in the light valves are of the transmissive type.

Light emitted by the light sources 12, 13 is guided into the light valves 7, 8, 9. After reflection on the reflector 31 the light exits the light valve on the viewing side 5 and is available for viewing after transmission through the illumination unit 30. Since the light passes through the colour filter twice, the transmittance of the colour filters should be adapted accordingly; e.g. the colour of the filter should be less saturated than for transmissive use. The operation of the light sources and the colour filters is the same as in the embodiment of FIG. 1.

Although the above embodiments of the display device include two light sources and two colour filters, the illumination unit may include three light sources and/or the light valve three colour filters, thereby increasing the gamut of the display. The colours of the three light sources can for example be red, green and blue.

Figure 3:
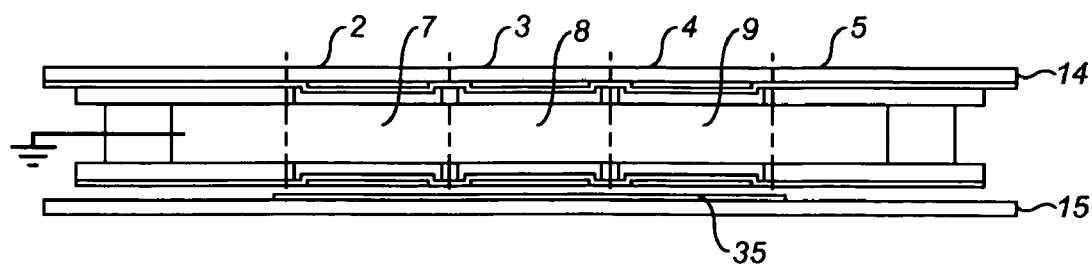
FIG. 3 shows a diagrammatic cross-section of a part of the third embodiment of the display device.

FIG. 3 shows a third embodiment of the colour display device. A plurality of light valves 7, 8, 9, of which again only three are shown, is arranged between the two support plates 14 and 15. The support plate 15 is provided with a controllable reflector 35. The controllable reflector may be made of a liquid crystal material using switchable birefringence or of an addressable photo-polymer. The controllable reflector may comprise one or more electrowetting cells including two fluids, one fluid reflecting a first colour and the other fluid reflecting a second colour. The reflector is provided with electrodes and connected to the control unit. It allows a reflectance selectable between a first state in which a first colour is reflected and a second state in which a second colour is reflected. In one embodiment the first colour is yellow and the second colour is blue.

Ambient light incident from the viewing side 5 will be reflected by the controllable reflector and returned towards the viewing side. The spectral range that will be reflected depends on the state of the controllable reflector. The switchable colour filters in each light valve together with the controllable reflector determine the spectral range of the incident light that is emitted towards the viewer. The controllable reflector may be in the form of a controllable colour filter in front of a broad-band reflector, wherein the spectral range of the transmission of the filter can be switched between two colours. The filter may be based on electrophoretic bi-chromic, MEMS-based bi-chromic, bi-chromic reflective LC-type (TN, Cholesteric, PDLC, Bi-Nem), electrowetting or other reflective technologies.

The operation of the third embodiment of the display device is similar to that of the first and second embodiments. Instead of selecting the light source in each state, the spectral range of the controllable reflector is selected.

The display device of FIG. 3 is designed for operation in ambient light. The display device can also be provided with an illumination unit similar to the unit 31 shown in FIG. 2, but having a single white light source instead of the two selectable colour light sources 12 and 13. When the amount of ambient light is sufficient for forming an image having the desired level of brightness, the white light source can be switched off. When the ambient light level drops below a certain value, the white light source can be switched on to assist in providing a bright image.

A special embodiment of the display device includes a plurality of controllable reflectors, one for each light valve. These reflectors may be controlled simultaneously by the same control signal, thereby causing it to operate as a single controllable reflector. Alternatively, each controllable reflector may be controlled independently. In that case, it is possible to change the duration of the first and second stage for each light valve in dependence on the colour to be displayed. This can increase the brightness of the display. In this embodiment the reflectors may comprise electrowetting cells. In that case the display device may include one layer of electrowetting cells forming the light valves and a second layer of electrowetting cells forming the reflector.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A colour display device comprising a plurality of picture elements, the plurality of picture elements having a viewing side and a rear side, each picture element including a light valve, the display device comprising a switchable part for selectively directing light of a first colour and light of a second colour along a light path through the light valve from the rear side to the viewing side, and each light valve comprising a first and a second switchable colour filter having a transmittance for a third colour and a fourth colour, respectively, and arranged in succession in the light path, the first, second, third and fourth colour being different non-white colours.

2. A colour display device according to claim 1, wherein each picture element comprises one light valve.

3. A colour display device according to claim 1, wherein each light valve includes an electrowetting element having a fluid operable as switchable colour filter.

4. A colour display device according to claim 3, wherein the electrowetting element includes an electrowetting cell having two fluids independently operable as switchable colour filter.

5. A colour display device according to claim 1, wherein the switchable part includes an illumination unit for generating light of the first colour and light of the second colour.

6. A colour display device according to claim 5, wherein the illumination unit is arranged on the rear side of the plurality of light valves.

7. A colour display device according to claim 5, wherein the illumination unit is arranged on the viewing side of the plurality of light valves and a reflector is arranged on the rear side of the plurality of light valves.

8. A colour display device according to claim 1, wherein the switchable part includes a controllable reflector having a reflectance selectable between the first colour and the second colour and arranged on the rear side of the plurality of light valves.

9. A colour display device according to claim 8, wherein the controllable reflector includes a colour filter having a transmission selectable between the first colour and the second colour.

10. A colour display device according to claim 8, wherein the switchable part includes a plurality of controllable reflectors, each controllable reflector being arranged on the rear side of each of the light valves.

11. A colour display device according to claim 10, wherein the reflectance of each of the reflectors is independently controllable.

12. A colour display device according to claim 1, wherein the first colour and the third colour are complementary and the second colour and the fourth colour are complementary.

13. A colour display device according to claim 1, wherein the switchable part is arranged for selectively directing light of a further colour and/or the light valve comprises a further switchable colour filter having a transmittance for a further colour.

14. A method of forming a colour image using a plurality of picture elements, the plurality of picture elements having a viewing side and a rear side, each picture element containing a light valve, the method comprising the steps of time-sequentially directing light of a first colour and light of a second colour along a light path through the light valve from the rear side to the viewing side, and filtering the light by a first and a second switchable colour filter in the light valve, the first and second filter having a transmittance for a third colour and a fourth colour, respectively, and arranged in succession in the path of the light, the switching of the colour filters being synchronous with the time-sequentially directing light of the first colour and light of the second colour.

15. A method according to claim 14, including the step of generating the light of the first colour and the light of the second colour in an illumination unit.

16. A method according to claim 15, in which the illumination unit is arranged on the rear side of the plurality of light valves.

17. A method according to claim 15, in which the illumination unit is arranged on the viewing side of the plurality of light valves.

18. A method according to claim 14, the method including the step of passing light entering from the viewing side through light valves twice via a reflector arranged on the rear side of the plurality of light valves.

19. A colour display device according to claim 1, wherein the switchable part and each light valve are independently controllable.

20. A method according to claim 14, wherein the switching of the colour filters and the time-sequentially directing light are independently controllable.

* * * * *